United States Patent

Manjikian et al.

[15] 3,657,115

[45] Apr. 18, 1972

[54] SEMIPERMEABLE MEMBRANES THEIR USE AND METHOD FOR PREPARATION WHEREIN THE MEMBRANES ARE STRETCHED DURING THE INITIAL GELATION PERIOD

[72] Inventors: Serop Manjikian; Michael I. Foley, both of Del Mar, Calif.

[73] Assignee: The United States of America as represented by the Secretary of the Interior

[22] Filed: Jan. 27, 1971

[21] Appl. No.: 110,157

[52] U.S. Cl. ............................210/23, 210/500, 260/225, 260/227, 264/41, 264/210 R, 264/289, 264/299, 264/313, 264/316
[51] Int. Cl. ....................B29d 7/24, B29d 27/04, C08b 3/06
[58] Field of Search.....................264/41, 49, 216, 217, 313, 264/314, 316, 210 R; 106/187

[56]     References Cited

UNITED STATES PATENTS

| | | | |
|---|---|---|---|
| 3,432,585 | 3/1969 | Watson et al. | 264/216 X |
| 2,034,716 | 3/1936 | Dreyfus | 264/210 X |
| 1,862,541 | 6/1932 | Kratz | 264/316 X |
| 3,194,297 | 7/1965 | Coe | 264/313 X |

*Primary Examiner*—Philip E. Anderson
*Attorney*—Ernest S. Cohen and William S. Brown

[57]     ABSTRACT

Semipermeable membranes are prepared by casting a cellulose ester from a solution of the ester, and subsequently stretching the membrane, during its initial gelation period, in a direction at a right angle to the direction of casting. The resulting membranes exhibit superior selectivity in desalination of water by reverse osmosis.

4 Claims, No Drawings

SEMIPERMEABLE MEMBRANES THEIR USE AND METHOD FOR PREPARATION WHEREIN THE MEMBRANES ARE STRETCHED DURING THE INITIAL GELATION PERIOD

Reverse osmosis has attracted considerable interest in the field of purification of saline water. In this process, a pressure in excess of the osmotic pressure of the saline water feed solution is applied to the solution separated from purified water by a semipermeable membrane. Pure water is thereby caused to diffuse through the membrane, while the salt molecules or other impurities are retained by the membrane.

Efficiency of the reverse osmosis process depends to a large extent on the nature of the membrane and numerous types of membranes and methods of preparing them have been described in the prior art, e.g., in U.S. Pat. Nos. 3,133,132; 3,344,214; 3,412,184; 3,439,074 and 3,483,282. These membranes are commonly cast from a solution of the membrane material in an organic solvent, with or without additional solution components such as flux promoters, modifiers, swelling agents, etc. The membranes may be employed in the reverse osmosis process in the form of a free film or a film deposited on a porous support material.

In general, the operating effectiveness of a semipermeable membrane or composite is defined in terms of 1its selectivity or salt rejection, i.e., the percent rejection by the membrane of a nonpermeating component of the feed mixture and (2) flux, i.e., the rate of flow of the permeating component through the membrane. For example, if the feed mixture consists of an aqueous 1 percent sodium chloride solution and the permeating liquid has a sodium chloride content of 0.02 percent the membrane would be said to exhibit a 98 percent rejection of sodium chloride. Flux, for commercial purposes, is defined as gallons per square foot per day at a certain pressure.

Cellulose esters have been extensively employed as membrane materials in reverse osmosis desalination processes. Cellulose acetate is generally preferred because of its availability and low cost; commercial cellulose acetate (diacetate) containing from about 38 percent to about 40 percent acetyl content is readily available and suitable. However, various other esters have been used and may have advantageous properties for particular application. Examples of other esters are cellulose acetate butyrate, cellulose propionate, etc. These esters are conventionally prepared by reaction of cellulose with an acid or acid chloride, e.g., cellulose acetate is generally prepared by reaction of cellulose with acetic acid in the presence of chloroacetic anhydride.

The cellulose ester reverse osmosis membranes are conventionally prepared by casting from a solution comprising the ester, a water soluble organic solvent for the ester, and a flux promoter. In addition, pyridine may be included in the casting solution to increase the strength of the membrane. Suitable solvents include acetone, methanol, ethanol, methyl acetate, methyl ethyl ketone, etc. Flux promoters include water soluble liquid amides, such as formamide, methyl formamide, dimethyl formamide, etc., inorganic salts such as magnesium perchlorate, sodium chloride, zinc chloride, etc. Proportions of these ingredients are generally about 15 to 30 percent (by weight) ester, about 15 to 60 percent solvent, about 5 to 30 percent flux promoter and 0 to 50 percent pyridine.

Casting procedures are also conventional and typically involve application of the casting solution to the support surface by means of a doctor blade. Room temperature is usually satisfactory and preferred for casting, but temperatures may range from about −14 to 30° C. The wet thickness of the cast membrane will usually range from about 0.005 to about 0.015 inch. The film is then exposed to the atmosphere for a period up to about 90 seconds to permit evaporation of a portion of the organic solvent to produce an initial gelation and is then immersed in water at a temperature of about zero to 4° C, to complete gelation of the film and to remove water-soluble components of the casting solution. The film is then heated, preferably in water, at a temperature of about 65° to 95° C, for about 5 to 30 minutes to increase the selectivity of the membrane.

The above-described process and materials for preparation of cellulose ester semipermeable membranes are fully disclosed in U.S. Pat. No. 3,483,282.

It has now been found, according to the present invention, that the selectivity of cellulose ester semipermeable membranes of the type described above may be substantially improved by stretching the cast membrane during its initial gelation period, that is the period described above during which the film is exposed to the atmosphere. The stretching must, however, be in a direction essentially at a right angle to the direction of casting. Stretching in a direction parallel to the casting direction, or stretching after the membrane is fully gelled, actually results in decreased selectivity.

The stretching may be readily accomplished by casting or spreading the membrane casting solution on the surface of an elastomer sheet, such as of rubber. The sheet is then stretched in a direction at a right angle to the casting direction during the period that the solution is initially solidifying or gelling. Stretching may be accomplished by means of any conventional apparatus such as a rack with a movable bar for exerting tension and should be sufficient to result in an elongation of the membrane of about 2 to 10 percent.

The casting solution employed in the invention is conventional and comprises a cellulosic derivative such as cellulosic acetate, cellulose acetate butyrate, etc. in an amount of about 10 to +percent; a solvent such as acetone, dioxane, pyridine, etc., in an amount of about 30 to 70 percent; a modifier or flux promoter such as formamide, glycerol, n-propanol, glyoxal, lactic acid, in an amount of about 6 to 30 percent; and may contain other secondary solvents or modifiers such as pyridine, triethyl phosphate, glyoxal, etc., in an amount of about 1 to 25 percent, all these percentages being by weight. The specific constituents and proportions are not critical so long as a functioning semipermeable membrane is produced. Optimum thickness of the cast membrane solution prior to stretching will vary considerably with the specific membrane composition but will usually range from about .005 to 0.015 inch.

Initial gelation may be accomplished by simply exposing the cast membrane solution to the atmosphere at ambient conditions of temperature and pressure for a period of up to about 90 seconds, this being referred to as dry time. Preferably the dry time or initial gelation period is from about 10 to about 90 seconds. The stretching is effected during this initial gelation period or dry time and should be at a rate sufficient to accomplish the desired elongation in approximately the time required for initial gelation. Since the initial gelation period or dry time will vary somewhat with the specific membrane, the optimum rate of stretching will also vary, but is readily determined so that the required elongation may be produced. Thickness of the membrane following gelation and stretching will also vary with the membrane composition, amount of elongation, etc., but will usually range from about 0.002 to 0.008 inch.

Following the initial gelation and stretching operation, the membrane is preferably placed in water at a temperature of about zero to 4° C, for a period of about 30 to 90 minutes, in order to complete gelation and to leach out water soluble constituents. It is then removed, drained and heat treated at a temperature of about 65° to 95° C. in order to improve membrane selectivity and stability. This heat treatment is preferably accomplished by immersion in water at a temperature of about 65° to 95° C., for a period of about 5 to 30 minutes.

The following example will serve to more particularly illustrate the invention.

EXAMPLE

Two casting solutions, having the following compositions in percent by weight, were employed.

|  | Solution A | Solution B |
|---|---|---|
| Commercial Cellulose Diacetate | 25 | 25 |
| Acetone | 45 | 35 |

| | | |
|---|---|---|
| Formamide | 30 | 30 |
| Pyridine | 30 | 10 |

The solutions were cast into films by means of a doctor blade passing at a controlled distance over a latex (rubber) sheet secured to a rack type apparatus designed for stretching the sheet. The latex sheet was attached at one end to the stationary bar of a frame having side rails. The other end of the sheet was attached to a movable bar riding on these side rails. The stationary and movable bars could be moved apart or together by means of a screw thread actuating rod. The cast membrane solution had a thickness of about 0.012 inch.

The cast membrane was then allowed to gel over a 30 second dry time by exposure to the atmosphere at ambient conditions of temperature and pressure. Simultaneously, during this initial gelation period the latex sheet was uniformly stretched in directions both at a right angle and parallel to the direction of casting to give an elongation of the membrane as set forth in the data of Table 1. Thickness of the membrane following initial gelation and stretching was about 0.008 inch. The membrane was then placed in ice water for a period of one hour, and then heat treated by immersion in water at a temperature of 78° C., for 10 minutes.

The membranes were then tested in a conventional apparatus of the type described in U. S. Pat. No. 3,133,137. Results are given in Table 1. It will be seen from the data of Table 1 that stretching of the membrane produced a gain in selectivity of about 2 to 4 percent with only a moderate reduction in flux. It will also be noted that stretching in a direction parallel to the direction of casting resulted in decreased selectivity.

TABLE 1.—PERFORMANCE OF MEMBRANES STRETCHED DURING INITIAL GELATION

| Direction of stretching | Casting solution | Elongation, percent | Flux, gal./sq. ft. day | Salt rejection, percent |
|---|---|---|---|---|
| Right angle to direction cast. | A | 0 | 26.1 | 93.00 |
| | | 1 | 30.9 | 92.86 |
| | | 2 | 25.1 | 95.69 |
| | | 3 | 22.5 | 96.61 |
| | | 5 | 22.8 | 96.08 |
| | | 7 | 11.7 | 96.78 |
| | | 10 | 14.0 | 97.06 |
| Parallel to direction cast. | A | 0 | 18.85 | 96.46 |
| | | 1 | 36.40 | 87.75 |
| | | 2 | 36.40 | 88.45 |
| | | 3 | 23.92 | 95.83 |
| | | 5 | 21.32 | 95.94 |
| | | 10 | 25.22 | 94.82 |
| Right angle to direction cast. | B | 0 | 24.44 | 92.94 |
| | | 1 | 24.96 | 92.86 |
| | | 2 | 21.84 | 94.78 |
| | | 3 | 20.74 | 95.12 |
| | | 5 | 19.76 | 96.18 |
| | | 10 | 18.98 | 96.12 |
| Parallel to direction cast. | B | 0 | 21.36 | 93.84 |
| | | 1 | 28.60 | 89.08 |
| | | 2 | 29.90 | 82.60 |
| | | 3 | 33.80 | 80.82 |
| | | 5 | 33.40 | 78.30 |
| | | 10 | 30.16 | 83.68 |

We claim:

1. In a method for preparation of a semipermeable membrane for use in reverse osmosis desalination comprising (1) forming a thin film of a solution comprising a cellulose ester and a flux promoter from the group consisting of formamide, glycerol, n-propanol, glyoxal and lactic acid in an organic solvent by casting or spreading the solution, (2) effecting initial gelation of the film by exposure to the atmosphere at ambient conditions of temperature and pressure for a period of about 10 to 90 seconds, (3) placing the film in water at a temperature of about zero to 4° C., for a period of about 30 to 90 minutes to complete gelation and (4) heat treating the film at a temperature of about 65° to 95° C., the improvement comprising stretching the film during the initial gelation period in a direction essentially at a right angle to the direction of casting or spreading to effect an elongation of the film of about 2 to 10 percent.

2. The method of claim 1 in which the film of cellulose ester solution is cast or spread, gelled and stretched on a rubber sheet.

3. The semipermeable membrane prepared by the process of claim 1.

4. In a process for desalination of saline water by reverse osmosis comprising contacting the saline water under pressure with a reverse osmosis membrane, the improvement comprising using the membrane of claim 3 as the reverse osmosis membrane.

* * * * *